(12) United States Patent
Ivey et al.

(10) Patent No.: US 6,179,516 B1
(45) Date of Patent: Jan. 30, 2001

(54) PIPE RACK CRASH CUSHION

(75) Inventors: Don L. Ivey, Bryan; Richard A. Zimmer, College Station, both of TX (US)

(73) Assignee: The Texas A&M University System, College Station, TX (US)

(*) Notice: Under 35 U.S.C. 154(b), the term of this patent shall be extended for 0 days.

(21) Appl. No.: 09/261,635

(22) Filed: Mar. 3, 1999

Related U.S. Application Data

(63) Continuation-in-part of application No. 09/123,309, filed on Jul. 28, 1998, now Pat. No. 6,082,926.

(51) Int. Cl.[7] .................................................. E01F 13/00
(52) U.S. Cl. ................................ 404/6; 404/9; 256/13.1
(58) Field of Search ............................ 404/6, 9; 256/13.1

(56) References Cited

U.S. PATENT DOCUMENTS

| | | | |
|---|---|---|---|
| 3,666,055 | 5/1972 | Walker et al. | 188/1 C |
| 3,856,268 | 12/1974 | Fitch | 256/13.1 |
| 4,583,716 * | 4/1986 | Stephens et al. | 256/13.1 |
| 4,655,434 | 4/1987 | Bronstad | 256/13.1 |
| 4,822,011 * | 4/1989 | Goldbach et al. | 267/201 |
| 4,909,661 | 3/1990 | Ivey | 404/6 |
| 5,112,028 * | 5/1992 | Laturner | 256/13.1 |
| 5,192,157 | 3/1993 | Laturner | 404/6 |
| 5,217,318 * | 6/1993 | Peppel | 404/6 |
| 5,246,514 | 9/1993 | Alderman et al. | 156/73.1 |
| 5,286,137 | 2/1994 | Cicinnati et al. | 404/6 |
| 5,391,016 | 2/1995 | Ivey et al. | 404/6 |
| 5,531,540 * | 7/1996 | Wasserstrom et al. | 404/6 |
| 5,733,062 * | 3/1998 | Oberth et al. | 404/6 |
| 5,779,389 | 7/1998 | Niemerski | 404/6 |
| 5,797,592 * | 8/1998 | Machado | 256/13.1 |
| 5,851,005 * | 4/1997 | Muller et al. | 256/13.1 |

FOREIGN PATENT DOCUMENTS

1489065 * 5/1975 (GB) .......................................... 404/6

* cited by examiner

*Primary Examiner*—Eileen D. Lillis
*Assistant Examiner*—Raymond W Addie
(74) *Attorney, Agent, or Firm*—Shawn Hunter; Felsman, Bradley, Vaden, Gunter & Dillon, L.L.P.

(57) ABSTRACT

A collapsible crash barrier for use as and end treatment for a commonly known "Jersey Barrier" provides a frame assembly having a tubular construction and circular guides to control axial collapse of the barrier. A saddle is provided to rest upon and end section of a "Jersey Barrier" and slides along the top of a barrier when axially impacted by a vehicle in order to further control the collapse of the barrier.

20 Claims, 6 Drawing Sheets

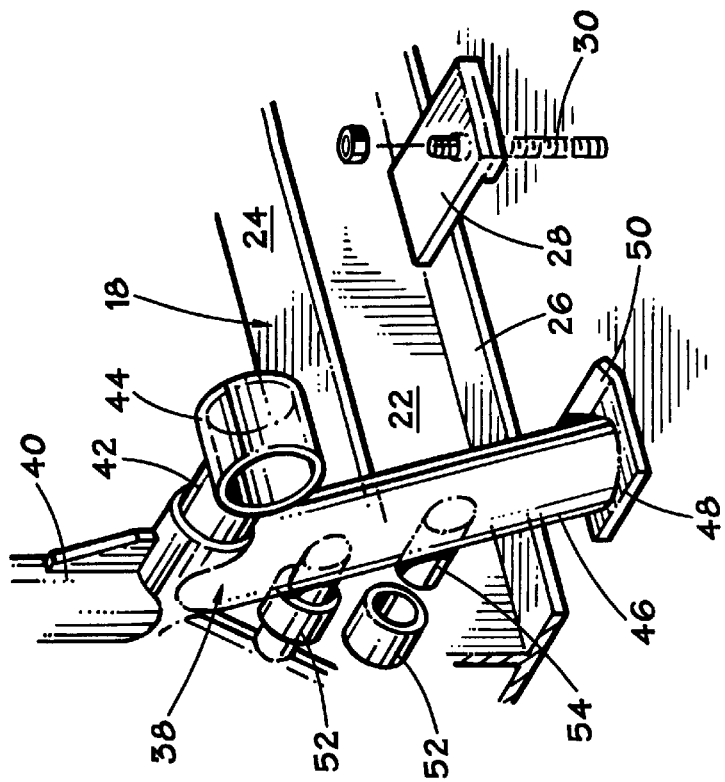
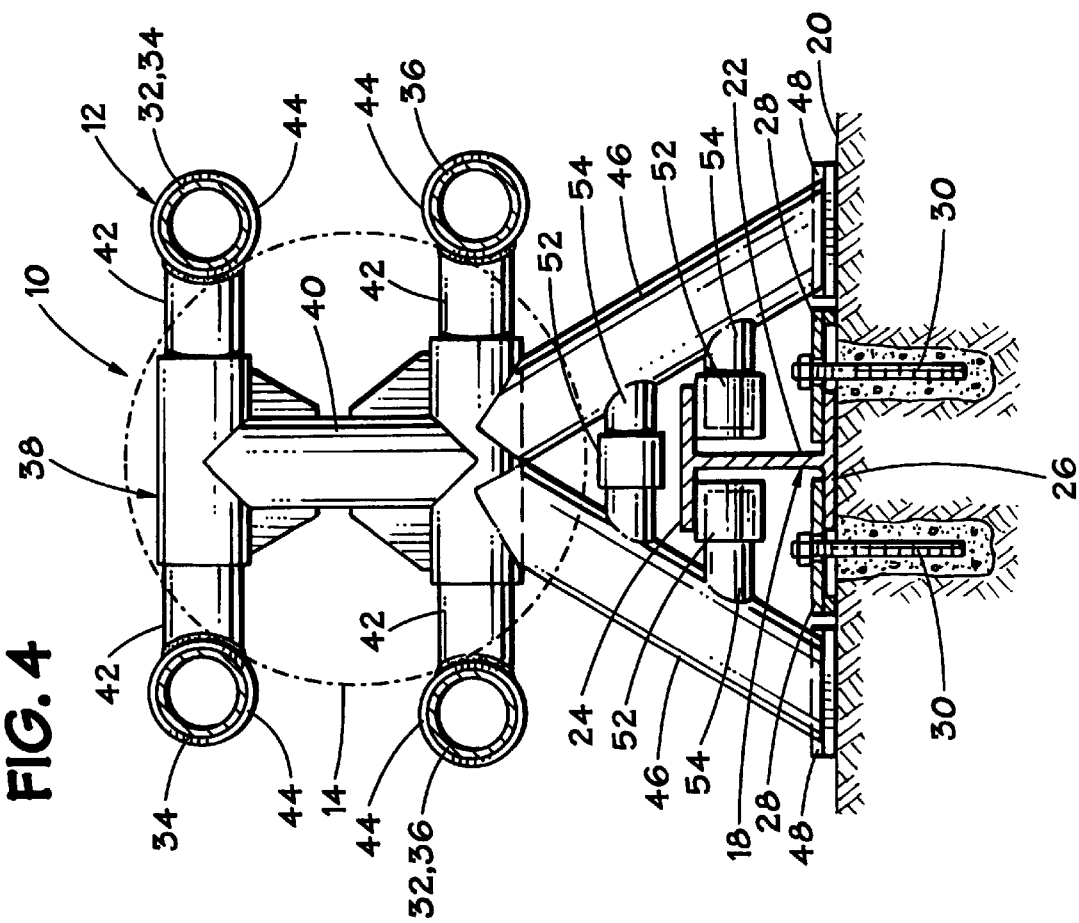

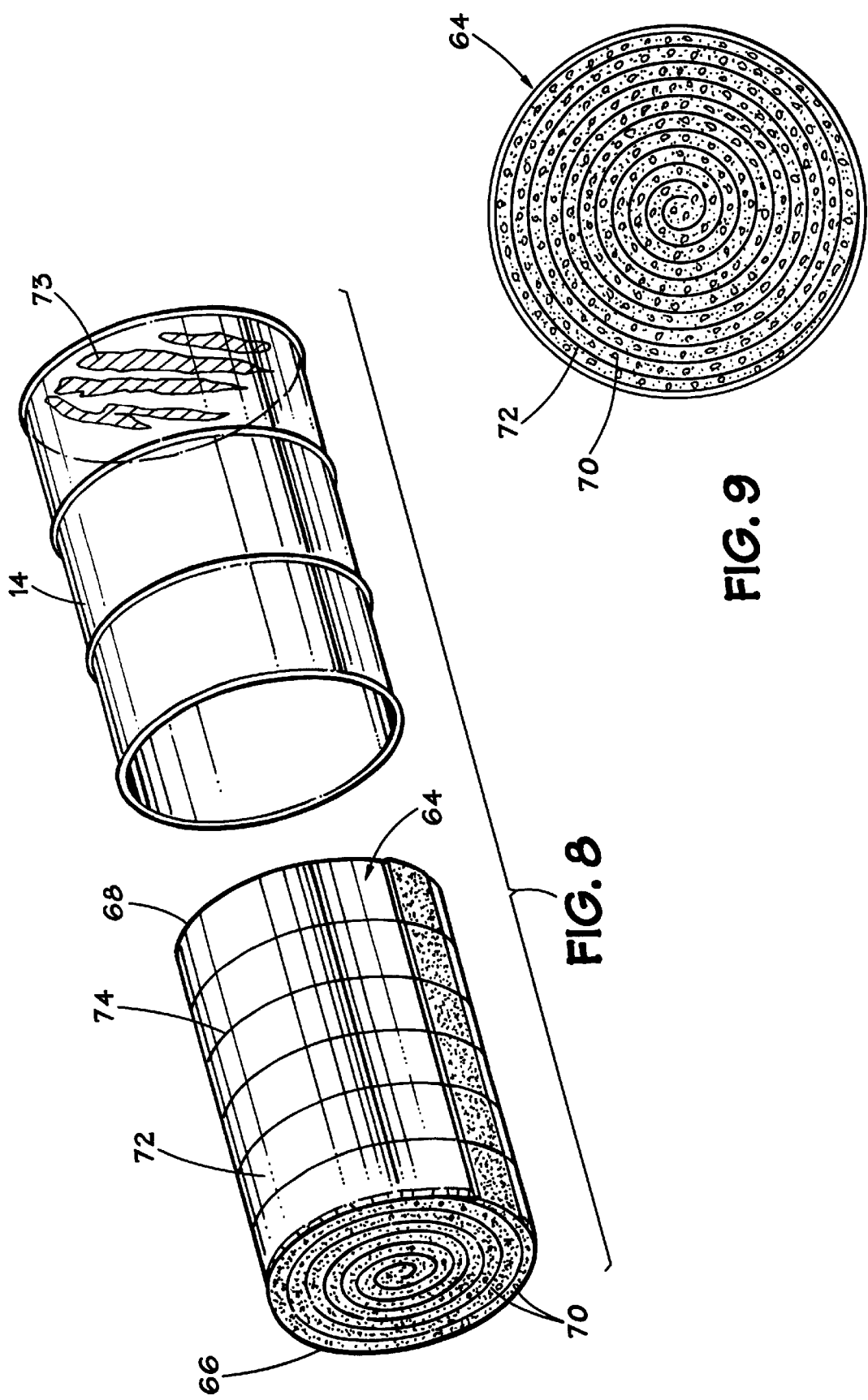

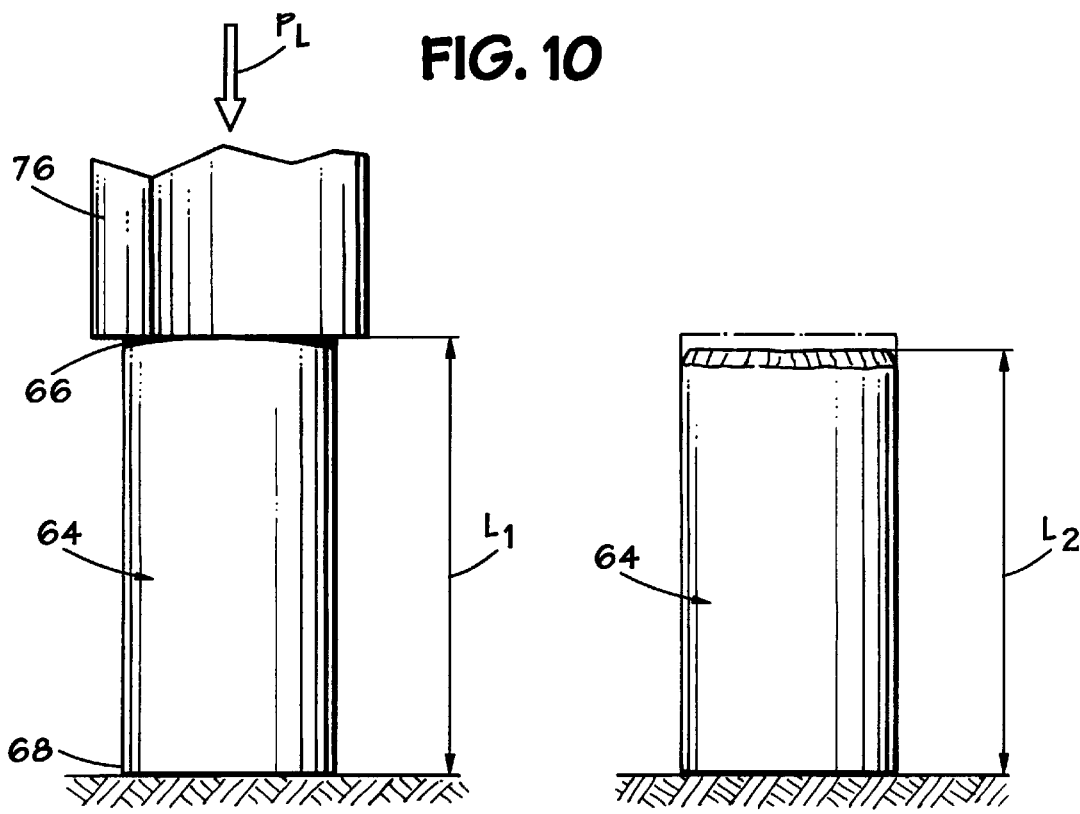
FIG. 10
FIG. 11
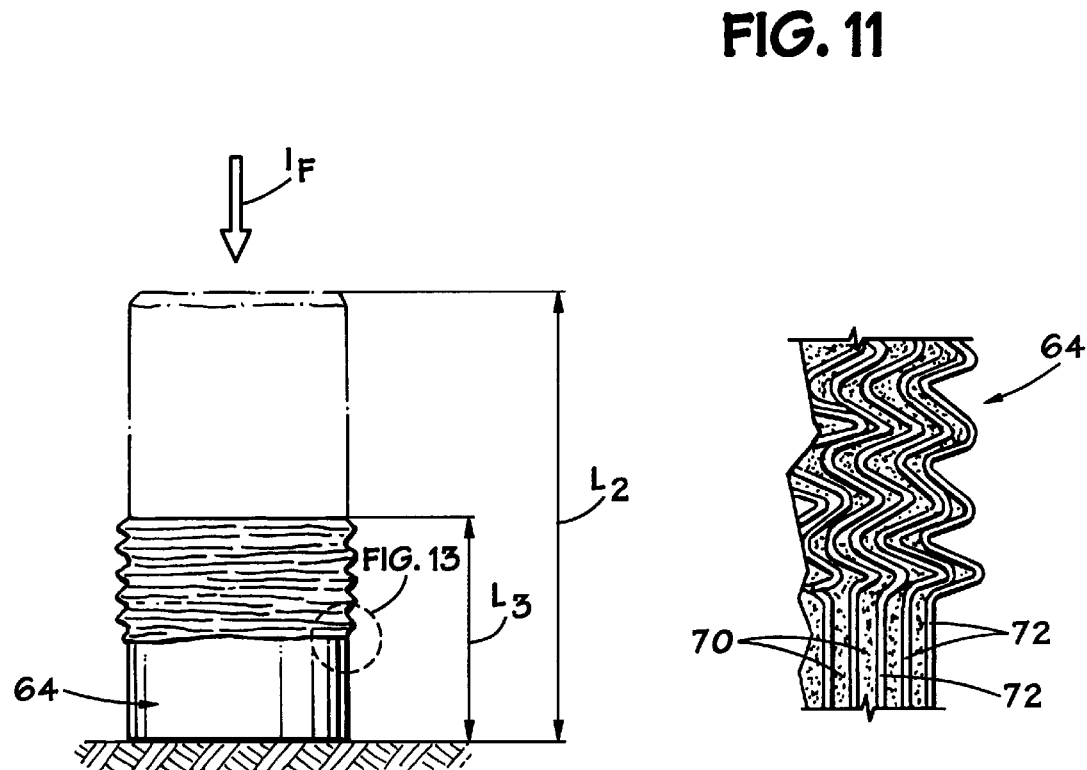
FIG. 12
FIG. 13

PIPE RACK CRASH CUSHION

CROSS-REFERENCE TO RELATED APPLICATIONS

This is a continuation-in-part of U.S. patent application Ser. No. 09/123,309, filed Jul. 28, 1998, which issued as U.S. Pat. No. 6,082,926 on Jul. 4, 2000.

BACKGROUND OF THE INVENTION

1. Field of the Invention

The present invention relates generally to crash cushions of the type used to arrest or slow vehicle impacts.

2. Description of the Related Art

There are some crash cushion systems that are designed to cushion vehicular impacts with the ends of portable concrete median barriers, or roadway dividers, as well as similar fixed objects. These systems include the REACT, ADIEM, Quad Guard and self-restoring Quad Guard systems. Portable concrete median dividers are placed temporarily in construction areas and the like to divide traffic. Occasionally, the dividers are left in place for an extended period of time. Unfortunately, the ends of the dividers present a deadly serious roadway hazard to vehicles which impact them.

If any crash protection is provided at all, it is typically provided by setting a group of plastic barrels out around the end of the divider. Sometimes the barrels are grouped together with metal banding.

Barrel-type barriers do not provide optimum cushioning. First, the number of barrels used is sometimes varied. As a result, too few barrels may be used to provide an effective cushion. Further, no matter how many barrels are used, this type of barrier does not provide a significant resilient redirective force against glancing impacts by vehicles.

Further, there continues to be a need for a low cost, reliable crash cushion which can be easily constructed from readily-available materials. Further, it is desirable to have a crash cushion which uses readily replaceable crushable portions so that the cushion can be quickly rebuilt following a collision.

SUMMARY OF THE INVENTION

A collapsible divider end treatment or crash cushion is described herein. The crash cushion is formed by a pipe rack frame that retains a number of axially disposed barrels, each of which contains crushable modules. The frame further features a slidable guide or guides which constrain the barrels and provide additional strength to the end treatment during an impact that does not proceed directly along the longitudinal axis of the barrels This allows the end treatment to substantially redirect impacting vehicles in a desirable manner.

In a preferred embodiment, the crash cushion employs barrels containing an energy-absorbent module that is useful for absorbing energy during a vehicular crash. The energy absorbent module provides a relatively constant and predictable level of crush resistance which makes it particularly suitable for such applications as an insert for a concrete divider or guardrail end treatment or other crash barrier.

The pipe rack crash cushion of the present invention provides a low cost alternative to conventional crash cushion. In addition, the pipe rack crash cushion allows the deceleration force provided by the crash cushion to be easily adjusted. Therefore, if a crash cushion is needed in special situations where the crash resistance force must be greater or lesser than that afforded by a conventional cushion, the adjustment may be easily made. The pipe rack of the present invention is also advantageous in that it can be rebuilt easily and inexpensively following a collision.

Thus, the present invention comprises a combination of features and advantages that enable it to overcome various problems of prior devices. The various characteristics described above, as well as other features, will be readily apparent to those skilled in the art upon reading the following detailed description of the preferred embodiments of the invention, and by referring to the accompanying drawings.

BRIEF DESCRIPTION OF THE DRAWINGS

For a more detailed description of the preferred embodiment of the present invention, reference will now be made to the accompanying drawings, wherein:

FIG. 4 is a cutaway view of the crash cushion depicted in FIG. 1.

FIG. 5 is a detail of portions of the frame and rollers of the crash cushion depicted in FIG. 1.

FIGS. 8 and 9 depict exemplary barrels and crush-resistant modules that are useful in the exemplary crash cushion described herein.

FIGS. 10 and 11 illustrate precrushing of an end portion of a module.

FIGS. 12 and 13 depict a module that has been crushed along substantially all of its useful length.

DETAILED DESCRIPTION OF THE PREFERRED EMBODIMENTS

Figure 1:
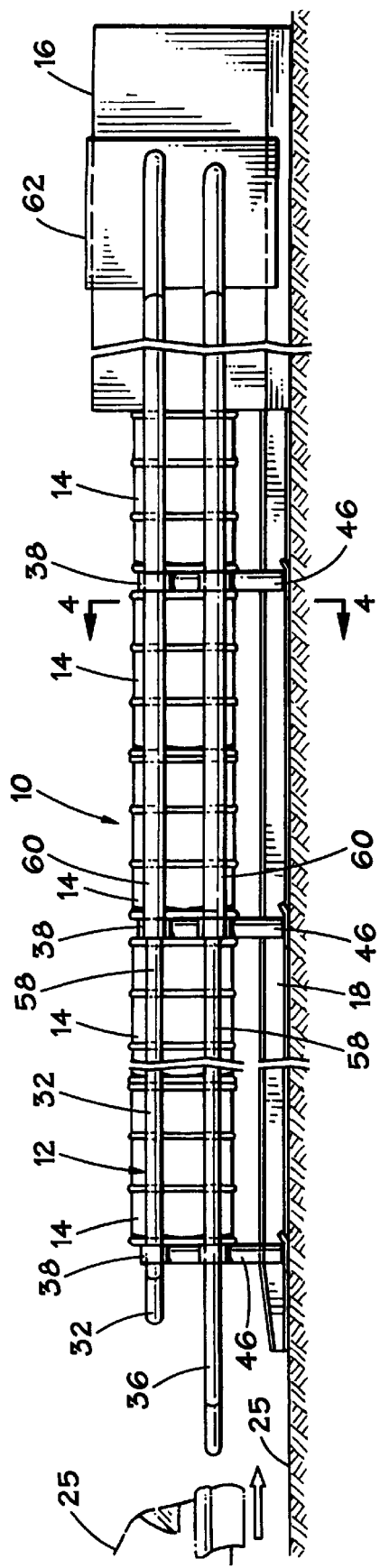
FIG. 1 is a side view of an exemplary collapsible crash cushion constructed in accordance with the present invention.
Figure 2:
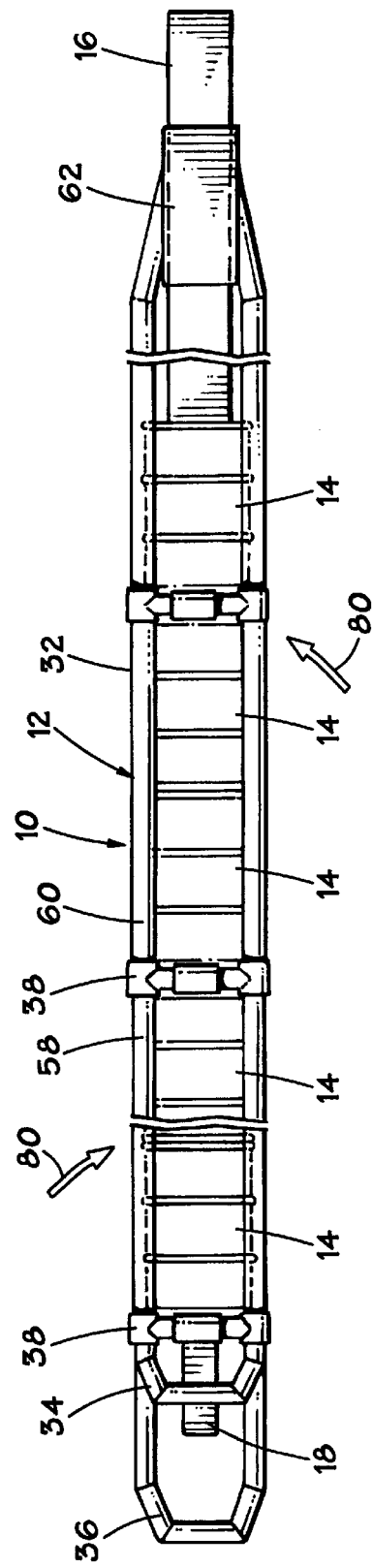
FIG. 2 is a side view of the crash cushion depicted in FIG. 1.

FIGS. 1 and 2 depict an exemplary end treatment 10 for a concrete divider, guardrail or other highway crash barrier. The end treatment 10 is made up of a tubular frame 12 and several axially disposed barrels 14 which are placed therein. The end treatment 10 is an exemplary device which might incorporate the crushable module as described in the present invention. The end treatment 10 is shown in FIG. 1 to be affixed to or located adjacent a concrete roadway divider 16 of a type which is well known and in place along most roadways. The treatment 10 is placed at the "upstream" end of the divider 16. The term "upstream," as used herein, means the general direction from which traffic, and thus impacts, are expected to approach. Conversely, the term "downstream" refers to opposite general direction. A vehicle 25 is shown in FIG. 1 approaching the end treatment 10 from an upstream end.

The frame 12 is preferably formed of steel or metal components which are welded to one another, although other means of affixing the components may be used. The end treatment 10 is adapted to collapse in a controlled manner when impacted from the upstream end, thus dissipating the impact energy of such an impact. A relatively uniform dissipation of energy during collapse is desirable to prevent injury to the passengers of the vehicle.

Construction of the frame 12 is shown in greater detail in FIGS. 3–6. The frame 12 includes a flanged runner 18 that is affixed to the ground 20. The runner 18 has an I-beam cross section, as best shown in FIGS. 4 and 5, made up of a central web 22 and upper and lower flanges 24, 26 which are perpendicularly oriented to the central web 22. The runner 18 is secured to the ground 20 using plates 28 which overlap portions of the lower flange 26 and are affixed by bolts 30 or other connectors to the ground 20.

The frame 12 also includes a pipe frame rack 32 that retains barrels 14 within the frame 12. In general, the rack 32 includes an upper longitudinal bracket assembly 34 and a lower longitudinal bracket assembly 36. As best shown in FIG. 4, the barrels 14 are retained within the frame 12 by the upper bracket assembly 34 above and by the lower bracket assembly 36 below.

The rack 32 also includes a plurality of slider assemblies 38, which slide along the length of the crash cushion 10 during an end-on impact to assist in causing a uniform crushing of the barrels 14. The slider assemblies 38 also ensure that the bracket assemblies 32, 34 of the rack 32 remain disposed a relatively uniform height above the ground 20 along their length. As will be described in furter detail below, the slider assemblies 38 also assist in redirecting vehicles which impact the crash cushion 10 from a lateral side.

Figure 3:
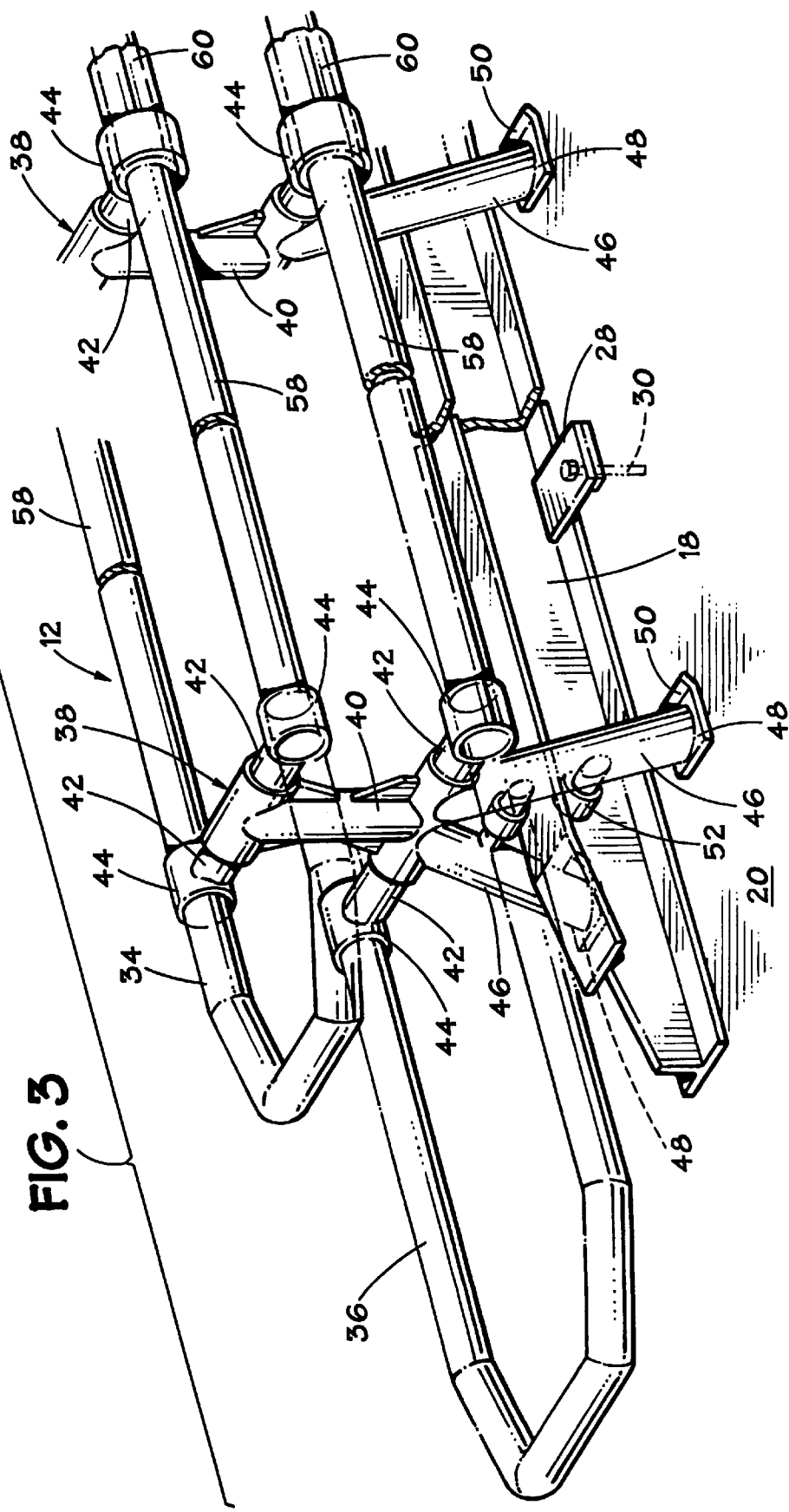
FIG. 3 is an isometric view of the upstream portion of the frame for the collapsible crash cushion of FIG. 1.

Construction of the slider assemblies 38 can be appreciated best with reference to FIGS. 3 and 4. The slider assemblies 38 are preferably constructed from pipe segments which are welded together. A central H-shaped pipe support 40 provides laterally protruding arms 42 having circular guides 44 at their ends which are shaped and sized to surround and guide portions of the upper and lower bracket assemblies 32, 34, as shown in FIG. 4. Two legs 46 extend downwardly from the central support 40. At the lower end of each of the legs 46, a ground-engaging skid plate 48 is affixed. The downstream side of the skid plate 48 includes an upwardly-directed flange 50.

Figure 6:
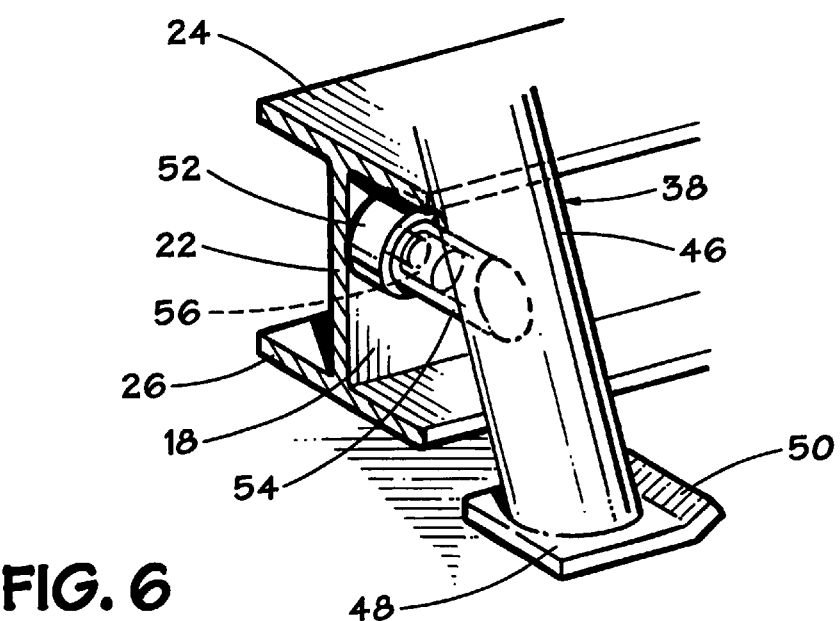
FIG. 6 is a detail depicting an alternative roller arrangement that is useful with the frame shown in FIG. 1.

The rack 32 is affixed in sliding relation to the runner 18 by means of an assembly of rollers 52 which are designed to engage the upper flange 24 of the runner 18 in a rolling and sliding relation as the slider assemblies 38 are moved axially along the runner 18 during a vehicular impact with the end treatment 10 from the upstream direction. FIGS. 4 and 5 depict one exemplary construction for the rollers 52. Three rollers 52 are shown. Two of the rollers engage the lower side of the upper flange 24. The third roller 52 engages the upper side of the upper flange 24. The rollers 52 are slidingly positioned upon sections of supporting pipe 54 and rotate about these sections. FIG. 6 shows an alternative construction for a roller 52. In this construction, the roller 52 is rotatably secured to a hub 56 that is affixed within a supporting pipe 54.

The upper and lower bracket assemblies 34, 36 are constructed of nested sections 58, 60 which permits the brackets 34, 36 to be collapsed in a telescoping manner. This nesting relationship is shown most clearly in FIG. 3 where it can be seen that the upstream bracket sections 58 are cross-sectionally smaller than the downstream brackets 60.

A substantially U-shaped saddle 62 covers the upper portion of the concrete divider 16 and is capable of sliding along the length of the divider 16. The downstream brackets 60 of the assemblies 34, 36 are welded or otherwise firmly affixed to the saddle 62.

FIGS. 8–13 show an exemplary crushable module 64, constructed in accordance with the present invention, which is used within one or more of the barrels 14 shown in FIGS. 1, 2 and 4. Module 64 is shown constructed from a pair of materials: a stronger, structural material, such as a sheet of metal of a strength and thickness to produce a desired crush force; and a weaker, non-structural spacer material, such as polyethylene foam. The module 64 is generally cylindrical in shape and has two axial ends 66, 68. The module should be appropriately sized to fit within the confines of the barrel 14. The module 64 is formed by adjacently locating a spacing layer 70 alongside a sheet of structural material 72. In a preferred embodiment, the spacing layer 70 comprises an air gap which is illustrated in FIGS. 8 and 9.

In an alternative embodiment, the layer 70 comprises a plurality of STYROFOAM® peanuts or another crushable filler. The sheet of structural material 72 comprises a metal sheet which is preferably 0.03"0 to 0.01" thick aluminum or 22 to 30 gauge galvanized steel. It is pointed out that the particular thicknesses mentioned have been currently determined to be preferable thicknesses. However, the invention is not intended to be limited in this regard.

The layer 70 and the structural sheet 72 are wound into a cylinder in such a manner that the layer and sheet 70, 72 form the spiral-shaped cross-section depicted in FIG. 9. As shown there, the winds or folds of the structural sheet 72 are separated by the spacer layer 70.

Once the rolling operation is completed, a binder may be applied to maintain the module 64 in its cylindrical shape. A currently preferred binder is an adhesive bonding material or glue 73 which is applied to one end 68 of the cylinder 64 and permitted to harden, thus ensuring that the layers of the structural sheet 72 remain in a spaced relation from one another. One method of applying the glue 73 to the end 68 is to place it within the barrel 14 so that once the cylinder 64 is disposed therewithin the glue 73 will adhere to the end 68.

Another currently preferred binder is a galvanized steel wire 74 of suitable thickness, such as 18 to 12 gauge. The wire 74 is attached to one axial end 66 of the module 64 and then wound in a spiral fashion around the module 64 along its length to the opposite axial end 68. The wire 74 is affixed to the ends 66, 68 by securing it through small holes (not shown) which are placed into the sheet metal. This affixation is normally done prior to the precrush step explained below. Other suitable binders may be used to secure or maintain the module 64 in a generally cylindrical shape including straps and so forth. It is pointed out that the use of a wire binder may also be omitted, if desired.

One axial end 66 of the module 64 is precrushed to create an initial weakness in the structure of the module 64 at a desired position. FIG. 10 illustrates one method of creating the precrushed portion of the axial end 66. As depicted in FIG. 10, the module 64 is placed into a press and an impacting member 76 is lowered onto the axial end 66 so that a precrushing load ($P_L$) is applied to the end 66 crushing a portion of it. If desired, portions of the end 66 may be crimped using a crimper prior to precrushing so that only the desired portion of the module 64 is crushed during the precrushing step. It is preferred that approximately one inch or so of the module 64 be precrushed in this manner. During axial precrushing or axial crushing of the module 64, the structural sheet 72 deforms along the length of the module 64 such that the initial length ("$L_1$") of the module 64 is reduced to a precrushed length ("$L_2$"). Following a vehicular impact, the impact force ("$I_F$") causes the module 64 to be crushed to a crushed length ("$L_3$"). The presence of the spacer layer 70 provides effective voids into which the structural sheet 72 can deform, as shown in FIG. 13.

It is noted that a typical module constructed in accordance with the present invention will provide crush resistance along 70–75% of its length. The crush resistance ranges from 4,000 to 30,000 pounds or more. The resistance provided by a module can be adjusted by altering the thickness of the sheet metal, the type of metal and/or the distance between the winds or folds.

Figure 7:
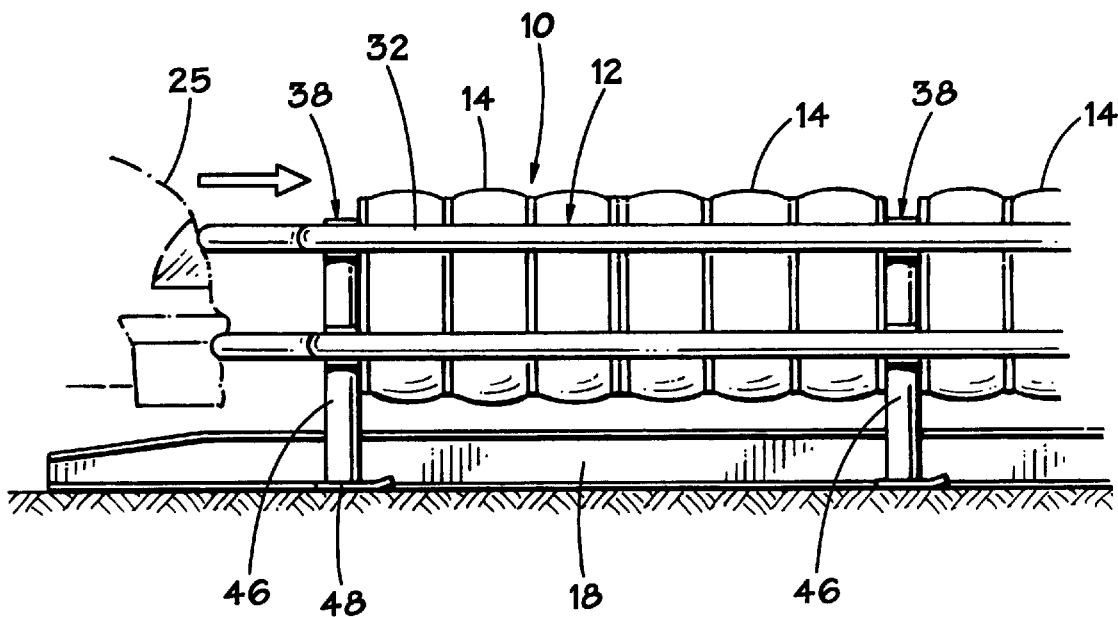
FIG. 7 depicts a vehicular impact at the upstream end of the crash cushion.

In operation, the crash cushion, or end treatment 10, may be impacted in a predominantly end-on fashion by a vehicle 25 approaching from the upstream direction. The upstream end of the frame brackets 32, 34 are contacted by the impacting vehicle as illustrated in FIG. 7. The impact causes the upstream bracket segments 58 to be telescopically moved into the cross-sectionally larger downstream bracket segments 60. As this occurs, the barrels 14 are crushed providing resistance to the impacting vehicle 25 and assisting in slowing and stopping it.

In addition to the crushing of the barrels 14, the saddle 62 may also be slid along the length of the divider 16 during the progress of the collision. Friction between the saddle 62 and the divider 16 further resists the collision forces, also assisting in slowing and stopping the vehicle 25.

The slider assemblies 38 provide for increased redirection in response to side impacts wherein the cushion is impacted in a glancing manner predominantly from a lateral side of the crash cushion 10 rather than from a predominantly end-on direction. Referring to FIG. 2, a lateral approach for a vehicle is illustrated by the arrows 80 in FIG. 2. The sliders 38 provide cross-bracing for the pipe frame rack 32 that will stiffen it and help it withstand the collision.

One advantage provided by the inventive crash cushion is the adjustability of the crash resistance which results from the crushable modules used. A particular desired crush resistance can be provided by changing the crush resistance provided by the insert modules 64. Crush resistance can be changed by, for example, using a stronger material for the structural sheet 72 or creating a tighter winding of the spiral shape for the cylinder of the module 64.

Although the crash cushion 10 is shown being used for the end of a concrete divider, it should be understood that the cushion 10 would also be useful for cushioning impacts at the end of a corrugated metal guardrail or another linear median or traffic barrier. Further, the crash cushion 10 may also be modified for cushioning vehicle impacts which may occur at non-linear type obstacles such as bridge abutments, concrete underpass supports and other traffic hazards.

It is noted that the crash cushion of the present invention can be constructed at a lower cost and maintained at a lower cost than alternative conventional crash cushions. Currently, the market price for a system of the type described herein is expected to be around $6,000 to $8,000. In contrast, the market price for a comparable ADIEM system is around $10,000. The market price for the REACT and Quad Guard systems is around $15,000 while the self-restoring Quad Guard system cost is around $25,000.

While preferred embodiments of the invention have been shown and described, modifications thereof can be made by one skilled in the art without departing from the spirit or teaching of this invention. The embodiments described herein are exemplary only and are not limiting. Many variations and modifications of the system and apparatus are possible and are within the scope of the invention. Accordingly, the scope of protection is not limited to the embodiments described herein, but is only limited by the claims which follow, the scope of which shall include all equivalents of the subject matter of the claims.

What is claimed is:

1. A collapsible crash cushion comprising:
    a) an elongated frame;
    b) a plurality of crushable modules retained within the frame;
    c) a slider disposed between a pair of modules; and
    d) the slider having a circular guide to surround and guide portions of the frame therethrough.

2. The crash cushion of claim 1 further comprising a flanged runner for guiding the slider during a crash.

3. The crash cushion of claim 1 wherein the frame comprises a pair of longitudinal members which at least partially surround said crushable modules.

4. The crash cushion of claim 3 wherein the longitudinal members comprise a pair of nested member portions that move telescopically with respect to one another.

5. The crash cushion of claim 1 wherein each of said crushable modules further comprises a barrel containing a crushable insert.

6. The crash cushion of claim 5 wherein the crushable insert comprises a structural member which is formed from a structural sheet which has been formed into a cylinder.

7. The crash cushion of claim 6 wherein the crushable insert further comprises a spacer layer disposed between winds of the structural sheet.

8. The crash cushion of claim 7 wherein the spacer layer comprises air.

9. The crash cushion of claim 7 wherein the spacer layer comprises a STYROFOAM® filler.

10. The crash cushion of claim 1 wherein the slider is secured in a slidable relation to a rail member.

11. The crash cushion of claim 1 wherein the slider comprises a generally H-shaped support member.

12. The crash cushion of claim 11 wherein the slider further comprises a pair of ground-engaging legs that extend downwardly from the H-shaped member.

13. The crash cushion of claim 12 further comprising a roller which extends laterally from one of said legs to engage a rail member in rolling relation.

14. A collapsible crash cushion comprising:
    a) a longitudinal runner;
    b) a slider having a roller to engage the runner in a rolling relation; and
    c) a crushable member, and
    d) a saddle to contact and slide along a longitudinal, non-collapsible crash barrier.

15. The crash cushion of claim 14 further comprising a frame to retain the crushable member above the runner.

16. The crash cushion of claim 15 wherein the frame comprises a horizontal longitudinal member which surrounds the crushable member.

17. The crash cushion of claim 16 wherein the longitudinal member comprises a pair of nested sections which are collapsible in a telescoping manner.

18. The crash cushion of claim 14 wherein the longitudinal crash barrier comprises a concrete median barrier.

19. A collapsible crash cushion for cushioning vehicular impacts with a crash barrier, the crash cushion comprising:
    a) a crushable member for absorbing impact energy; and
    b) a frame for retaining the crushable member, and
    c) a saddle affixed to the frame to contact and slide along a non-collapsible crash barrier.

20. The crash cushion of claim 19 further comprising:
    a) a longitudinal runner that is affixed to a section of ground; and
    b) means for interconnecting portions of the frame with the runner.

* * * * *